US012528909B2

(12) United States Patent
Wang et al.

(10) Patent No.: US 12,528,909 B2
(45) Date of Patent: Jan. 20, 2026

(54) CARDANOL-DERIVATIVES MODIFIED POLYMER AND A COATING COMPOSITION COMPRISING THE SAME

(71) Applicant: BASF Coatings GmbH, Münster (DE)

(72) Inventors: Han Bin Wang, Shanghai (CN); Qiang Li, Shanghai (CN); Stefan Hirsemann, Shanghai (CN)

(73) Assignee: BASF COATINGS GMBH, Muenster (DE)

(*) Notice: Subject to any disclaimer, the term of this patent is extended or adjusted under 35 U.S.C. 154(b) by 791 days.

(21) Appl. No.: 17/637,295

(22) PCT Filed: Aug. 24, 2020

(86) PCT No.: PCT/EP2020/073633
§ 371 (c)(1),
(2) Date: Feb. 22, 2022

(87) PCT Pub. No.: WO2021/037799
PCT Pub. Date: Mar. 4, 2021

(65) Prior Publication Data

US 2022/0282032 A1 Sep. 8, 2022

(30) Foreign Application Priority Data

Aug. 28, 2019 (WO) ................ PCT/CN2019/103107

(51) Int. Cl.
*C08G 63/47* (2006.01)
*C08K 5/00* (2006.01)
*C09D 167/07* (2006.01)

(52) U.S. Cl.
CPC ............ *C08G 63/47* (2013.01); *C08K 5/0025* (2013.01); *C09D 167/07* (2013.01); *C08G 2150/00* (2013.01)

(58) Field of Classification Search
None
See application file for complete search history.

(56) References Cited

U.S. PATENT DOCUMENTS

| | | | |
|---|---|---|---|
| 3,082,180 A | 3/1963 | Boldizar et al. | |
| 4,105,708 A | 8/1978 | Parekh et al. | |
| 4,293,692 A | 10/1981 | Pai et al. | |
| 10,035,754 B2 * | 7/2018 | Thibeault | C07D 303/23 |

FOREIGN PATENT DOCUMENTS

| | | |
|---|---|---|
| CN | 103755935 B | 1/2016 |
| CN | 104744407 B | 10/2016 |
| CN | 107022061 A | 8/2017 |
| CN | 108299165 A | 7/2018 |
| WO | 2015168771 A1 | 11/2015 |

OTHER PUBLICATIONS

Methacrylate Esters Safe Handling Manual, Methacrylate Producers Association, Mar. 25, 2019. (Year: 2019).*

Suresh, K.I. and Jaikrishna, M. (2005), J. Polym. Sci. A Polym. Chem., 43: 5953-5961 (Year: 2005).*

International Search Report and Written Opinion for PCT/EP2020/073633 mailed Oct. 26, 2020; 9 Pages.

* cited by examiner

*Primary Examiner* — Robert S Jones, Jr.
*Assistant Examiner* — Lily K Sloan
(74) *Attorney, Agent, or Firm* — Armstrong Teasdale LLP

(57) ABSTRACT

Described herein is a cardanol-derivatives modified polymer obtained from a reaction of epoxy groups in a cardanol-derivative compound and carboxyl groups in a carboxyl-functional polymer, where the cardanol-derivative compound is the reaction product of cardanol-derivatives modified with haloalkylene oxide having a carbon number of from 3 to 10. Also described herein is a process of preparing the cardanol-derivatives modified polymer, a method of using the cardanol-derivatives modified polymer in automotive coatings, and the obtained coating composition thereof.

13 Claims, No Drawings

CARDANOL-DERIVATIVES MODIFIED POLYMER AND A COATING COMPOSITION COMPRISING THE SAME

CROSS-REFERENCE TO RELATED APPLICATIONS

This application is a U.S. National Phase Application of PCT/EP2020/073633, filed Aug. 24, 2020, which claims the benefit of priority to PCT/CN2019/103107, filed Aug. 28, 2019, the entire contents of which are hereby incorporated by reference herein.

TECHNICAL FIELD

The present invention relates to a cardanol-derivatives modified polymer and a coating composition comprising the cardanol-derivatives modified polymer and in particular an automotive coating composition comprising the cardanol-derivatives modified polymer.

BACKGROUND

For solvent-borne coatings, due to the increasingly strict VOC (volatile organic compounds) regulations, coatings having low VOC or high solid content are becoming more and more attractive in the market. "High solid content" in automotive coatings fields refers to a high non-volatile content (e.g. >40% by weight) in solvent-borne coating compositions or paints. Normally the non-volatile content is determined according to ASTM D2369 in which the tested sample is heated at 110° C. for 60 minutes.

However, the coating compositions having a "high solid content" tend to have a high viscosity as well, which brings a lot of problems such as long filtration time during manufacturing process, low flowability during the spraying or spreading of the coating compositions onto an article to be coated etc.

Take epoxy acrylate resin for example, the traditional type i.e. bisphenol A epoxy acrylate has the problem of high viscosity and to overcome such problem, modifications on resins is one of the solutions. Cardanol modified acrylate resin is a good option since cardanol is a natural phenolic compound extracted from cashew nut shells that is the by-product of cashew industry and has advantages of low price, natural degradation etc. A Chinese patent application CN107022061A disclosed a method of synthesizing a UV-curing biomass epoxy acrylate prepolymer, the obtained prepolymer as well as its applications in coatings, inks and adhesives. The synthesis method comprises steps of using cardanol as a main raw material, enabling phenolic hydroxyl in cardanol molecules and epichlorohydrin to react, enabling double bonds in the cardanol molecules and hydrogen peroxide to react to bring in a plurality of epoxy groups, and enabling the epoxy groups to react with (meth)acrylic acid so as to obtain the UV-curing biomass epoxy acrylate prepolymer. According to table 1 in CN107022061A the lowest viscosity reached is 5.2 Pa·s. However, under certain circumstances, an even lower viscosity is required that is not able to fulfill by the method of CN107022061A.

Therefore, it still requires a new type of cardanol-modified acrylate resin to reach a further lower viscosity. Thus, the coating composition needs even less solvent to achieve a strict requirement of low VOC.

SUMMARY OF THE INVENTION

In one aspect, the present invention provides a cardanol-derivatives modified polymer obtained from a reaction of epoxy groups in a cardanol-derivative compound and carboxyl groups in a carboxyl-functional polymer, wherein the cardanol-derivative compound is the reaction product of cardanol and haloalkylene oxide having a carbon number from 3 to 10, preferably from 3 to 6 and more preferably from 3 to 4.

In another aspect, the present invention provides a method of preparing the cardanol-derivatives modified polymer of the present invention.

In another aspect, the present invention provides a coating composition comprising the cardanol-derivatives modified polymer of the present invention.

In another aspect, the present invention provides a method of preparing a coating composition comprising the cardanol-derivatives modified polymer of the present invention.

In a further aspect, the present invention provides a use of the coating composition of the present invention in automotive original equipment manufacture or automotive refinishing, particularly in automotive clearcoat.

It is surprisingly found that, the cardanol-derivatives modified polymer of the present invention will lead to a coating composition that has a higher nonvolatile content and lower viscosity than a coating composition containing the same amount of corresponding polymer without modification. As a result, the coating composition comprising the cardanol-derivatives modified polymer requires less solvent and therefore a low VOC coating is obtained.

DETAILED DESCRIPTION OF THE INVENTION

The following terms, used in the present description and the appended claims, have definitions as below:

Expressions "a", "an", "the", when used to define a term, include both the plural and sin-gular forms of the term.

All percentages and ratios are mentioned by weight unless otherwise indicated.

The term "and/or" includes the meanings "and", "or" and also all the other possible combinations of the elements connected to this term.

The term "polymer", as used herein, includes both homopolymers, that is, polymers prepared from a single reactive compound, and copolymers, that is, polymers prepared by reaction of at least two polymer forming reactive, monomeric compounds.

The term "(meth)acrylic" is intended below to designate acrylic and/or methacrylic. The term "(meth)acrylate" is intended below to designate acrylate and/or methacrylate.

The measurement methods to be employed for the purposes of the present invention to determine particular parameters can be found in the Examples section. Unless explicitly indicated otherwise, these measurement methods are to be used for determining the parameter in question.

In the present invention, "binder" refers to the film-forming components of the coating compositions. Thus, resins, curing agents, and other film-formers are part of the binder, but solvents, pigments, additives like antioxidants, HALS, UV absorbers, leveling agents, and the like are not part of the binder. In the present invention, when mentioned, "binder resin" means the polymeric resin component used in the coating compositions.

In the context of the present invention, the concept of the "curing" of a coating composition on a substrate refers to the conversion of the film of coating composition, applied to the substrate, into the service-ready state, in other words into a state in which the substrate furnished with the coating film in question can be transported, stored, and used as intended.

A cured coating film, then, is in particular no longer soft or tacky, but is instead conditioned as a solid coating film which, even on further exposure to curing conditions as described later on below, no longer exhibits any substantial change in its properties such as hardness or adhesion to the substrate.

Carboxyl-Functional Polymer

The carboxyl-functional polymer of the present invention is any type of carboxyl groups containing polymer that is used in coatings as a binder resin and has an acid number of 100 to 200 mg KOH/g.

Preferably, the carboxyl-functional polymer is at least one selected from the group consisting of carboxyl-functional polyacrylics, carboxyl-functional polyesters, carboxyl-functional polyurethanes, and carboxyl-functional polyamides having an acid number of 100 to 200 mg KOH/g.

Preferably, the weight average molecular weight of said carboxyl-functional polymer is from 1000 g/mol to 12000 g/mol, more preferably from 1000 g/mol to 10000 g/mol, even more preferably from 1000 g/mol to 5000 g/mol, and most preferably from 1500 g/mol to 3500 g/mol.

Preferably, said carboxyl-functional polymer comprises at least one carboxyl-functional poly(meth)acrylate. The carboxyl-functional polyacrylics suitable for the present invention can also be obtained from the polymerization of a monomer mixture containing a hydroxy alkyl (meth)acrylate monomer and a linear or cyclic alkyl dicarboxyl acid or the anhydride thereof, such as linear or cyclic $C_2$-$C_6$ alkyl dicarboxyl acid or the anhydride thereof. In addition, in an embodiment of the present invention, the monomer mixture may further contain a lactone monomer.

Nonlimiting examples of the hydroxy alkyl (meth)acrylate monomer that can be used in the present invention comprise hydroxy $C_2$-$C_4$ alkyl (meth)acrylate, such as hydroxyethyl (meth)acrylate, hydroxybutyl (meth)acrylate, hydroxypropyl (meth)acrylate.

Nonlimiting examples of the lactone monomer that can be used in the present invention comprise γ-butyrolactone, δ-valerolactone and ε-caprolactone.

Nonlimiting examples of the linear or cyclic alkyl dicarboxyl acid or the anhydride thereof that can be used in the present invention include succinic acid, glutaric acid, adipic acid, cyclobutane-1,2-dicarboxyl acid, cyclopentane-1,2-dicarboxyl acid, 1,2-cyclohexanedicarboxyl acid, and the anhydride thereof.

In a preferable embodiment of the present invention, the carboxyl-functional polymer of the present invention is obtained from the polymerization of hydroxyethyl (meth) acrylate, ε-caprolactone and 1,2-cyclohexanedicarboxyl anhydride. In an embodiment of the present invention, in addition to hydroxyethyl (meth)acrylate, ε-caprolactone and 1,2-cyclohexanedicarboxyl anhydride, (meth)acrylic acid monomer can also be contained in the monomer mixture for obtaining the carboxyl-functional polymer of the present invention.

Other monomers may also be used as comonomer in preparing the carboxyl-functional polyacrylics suitable for the present invention. Such comonomer may be, such as, styrene, (meth)acrylates, and the like. For example, the (meth)acrylate may be selected from the group consisting of methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, 2-ethylhexyl acrylate, 2-ethylhexyl methacrylate, 3,3,5-trimethylhexyl acrylate, and 3,3,5-trimethylhexyl methacrylate.

The carboxyl-functional polyacrylics suitable for the present invention may be prepared using conventional free radical polymerization techniques, such as by heating the monomers in the presence of a polymerization initiator. A skilled person can select appropriate temperature for the polymerization. For example, the temperature may be in a range from 20 to 200° C. Initiators for free radical polymerization can be used. Typical initiators may be organic peroxides, for example, dialkyl peroxides such as di-t-butyl peroxide, peroxyesters such as t-butyl peroxy 2-ethylhexanoate, and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis (cyclohexanecarbonitrile); and combinations of these.

The carboxyl-functional polymer of the present invention may also be carboxyl-functional polyesters, carboxyl-functional polyurethanes, and carboxyl-functional polyamides, that are suitable for being used as binder resin in coating compositions. These carboxyl-functional polymers may be obtained by a skilled person in the art according to conventional process.

Preferably, the acid number of the carboxyl-functional polymer is in the range from 100 to 200 mg KOH/g. For example, the acid number of the carboxyl-functional polymer of the present invention is in a range from 120 to 180 mg KOH/g, such as in a range from 130 to 150 mg KOH/g.

Cardanol-Derivative Compound

Cardanol is a phenolic lipid obtained from anacardic acid, the main component of cashew nutshell liquid, a byproduct of cashew nut processing.

Starting from cardanol, a cardanol-derivative compound is prepared by reacting with at least one haloalkylene oxide. Preferably, said haloalkylene oxide has a carbon number from 3 to 10, more preferably from 3 to 6, and even more preferably from 3 to 4. The halogen element in said haloalkylene oxide is at least one selected from the group consisting of F, Cl, Br, and I.

Preferably, said haloalkylene oxide is at least one selected from epichlorohydrin, epi-bromohydrin, epiiodohydrin, I-chloro-3,4-epoxybutane, 1-bromo-3,4-epoxybutane, 1-iodo-3,4-epoxybutane, 1-chloro-4,5-epoxypentane, I-bromo-4,5-epoxypentane, 1-iodo-4,5-epoxypentane, I-chloro-5,6-epoxyhexane, I-bromo-5,6-epoxyhexane, 1-iodo-5,6-epoxyhexane.

Preferably, the molar ratio of cardanol to the haloalkylene oxide for reaction is from 1:1 to 1:1.1. The synthesis method of said cardanol-derivative is known in the art, for example, in CN108299165A.

Cardanol-Derivatives Modified Polymer

The cardanol-derivatives modified polymer of the present invention is obtainable from the reaction of epoxy groups in the cardanol-derivative compound and the carboxyl groups in the carboxyl-functional polymer, based on the typical epoxy-acid reaction.

In the epoxy-acid reaction of the present invention, the molar ratio of the total epoxy group from the cardanol-derivative compound to the total carboxy from the carboxyl-functional polymer may be 1:1 or less. Additionally, relative to the total epoxy group from the cardanol-derivative compound of the present invention, a slight excess of the total carboxy from the carboxyl-functional polymer is preferable for the purpose of the present invention. For example, the molar ratio of the total epoxy group from the cardanol-derivative compound to the total carboxy from the carboxyl-functional polymer may be in a range from 2:3 to 1:1, such as 3:4 to 1:1.

Preferably, in the epoxy-acid reaction of the present invention, at least 60% of the carboxy in the carboxyl-functional polymer is reacted with the epoxy group in the cardanol-derivative compound. For example, in particular at least 65%, such as at least 75%, of the carboxy in the carboxyl-functional polymer is reacted with the epoxy group in the cardanol-derivative compound.

The epoxy-acid reaction of the present invention is carried out at a temperature lower than 200° C. in the presence of solvent. Preferably, the epoxy-acid reaction of the present invention is carried out at a temperature of from 120° C. to 180° C., more preferably from 140° C. to 160° C.

Solvents appropriate for the epoxy-acid reaction of the present invention are those inert to the epoxy-acid reaction. Nonlimiting examples of suitable solvents include aromatic hydrocarbons, alcoholic solvents, ester solvents, ketones, glycol ethers, and esters of glycol ethers. Specific examples include, without limitation, toluene, xylene, ethyl acetate, butyl acetate, hexyl acetate, acetone, butanone, cyclohexanone, methyl ethyl ketone, methyl isobutyl ketone, m-amyl acetate, ethylene glycol monobutyl ether acetate, propylene glycol monomethyl ether, propylene glycol monomethyl ether acetate, methanol ethanol, propanol, isopropanol, n-butanol, isobutanol, tert-butanol, N-methyl pyrrolidone, N-ethyl pyrrolidone, Aromatic 100, Aromatic 150, naphtha, mineral spirits, butyl glycol, and so on.

Optionally, catalysts are used in the epoxy-acid reaction of the present invention. All catalysts commonly used in an epoxy-acid reaction are applicable in the present invention, for example, a phosphorus containing catalyst. In one embodiment of the present invention, the catalyst is at least one selected from a group consisting of triphenyl phosphine, triphenyl antimony and chromium (III) acetyacetonate.

Appropriately, the weight average molecular weight of the cardanol-derivatives modified polymer of the present invention may be from 1200 g/mol to 20000 g/mol, preferably from 1500 g/mol to 15000 g/mol, more preferably from 2000 g/mol to 10000 g/mol, and even more preferably from 3000 g/mol to 5000 g/mol.

The cardanol-derivatives modified polymer of the present invention may have a glass transition temperature (Tg) of from −30° C. to 50° C., preferably from −10° C. to 50° C., more preferably from 5° C. to 35° C.

The viscosity of the cardanol-derivatives modified polymer of the present invention at 25° C. can be from 300 to 1000 mPa·s according to method CAP 2000, Brook field, 3 #spin.

The cardanol-derivatives modified polymer of the present invention may be used in preparing coatings, paints and the like.

With the cardanol-derivatives modified polymer of the present invention, the obtained coatings will have higher nonvolatile content and reduced viscosity, as compared with the corresponding conventional coatings.

Coating Composition

The present invention further relates to a coating composition containing the cardanol-derivatives modified polymer of the present invention, wherein the cardanol-derivatives modified polymer of the present invention is used as a binder resin. In an embodiment of the present invention, the cardanol-derivatives modified polymer of the present invention may be the only binder resin of the coating composition.

In the coating composition of the present invention, the amount of the cardanol-derivatives modified polymer of the present invention may be from 30% to 60% by weight, based on the total weight of the coating composition of the present invention, preferably from 40% to 60% by weight.

Another advantage of the present invention is that the cardanol-derivatives modified polymer of the present invention, when being used as a binder resin in a coating composition, can be cured via two approaches. The cardanol-derivatives modified polymer of the present invention may be cured via the C═C double bond and the hydroxyl group in the polymer, which makes the cardanol-derivatives modified polymer being cured more efficiently.

Curing agents suitable in the coating composition of the present invention include, without limitation, isocyanate curing agents, such as a polyisocyanate or blocked polyisocyanate curing agent. Useful polyisocyanate curing agents include, without limitation, isocyanurates, biurets, allophanates, uretdione compounds, and isocyanate-functional prepolymers such as the reaction product of one mole of a triol with three moles of a diisocyanate. The polyisocyanate may be blocked with lower alcohols, oximes, or other such materials that volatilize at curing temperature to regenerate the isocyanate groups.

Polyisocyanate or blocked polyisocyanate curing agent may be used in a 0.1 to 1.1 equivalent ratio, or in an equivalent ratio of 0.5 to 1.0 to each equivalent of functional groups reactive with it available from the curable binder resin.

Aminoplasts may also be used as curing agent in the coating composition of the present invention. An aminoplast for purposes of the present invention is a material obtained by reaction of an activated nitrogen with a lower molecular weight aldehyde, optionally further reacted with an alcohol (preferably a mono-alcohol with one to four carbon atoms) to form an ether group. Preferred examples of activated nitrogens are activated amines such as melamine, benzoguanamine, cyclohexylcarboguanamine, and acetoguanamine; ureas, including urea itself, thiourea, ethyleneurea, dihydroxyethyleneurea, and guanylurea; glycoluril; amides, such as dicyandiamide; and carbamate functional compounds having at least one primary carbamate group or at least two secondary carbamate groups.

The activated nitrogen is reacted with a lower molecular weight aldehyde. The aldehyde may be selected from formaldehyde, acetaldehyde, crotonaldehyde, benzaldehyde, or other aldehydes used in making aminoplast resins, although formaldehyde and acetaldehyde, especially formaldehyde, are preferred. The activated nitrogen groups are at least partially alkylolated with the aldehyde and may be fully alkylolated, preferably the activated nitrogen groups are fully alkylolated. The reaction may be catalyzed by an acid, e.g. as taught in U.S. Pat. No. 3,082,180, the contents of which are incorporated herein by reference.

The alkylol groups formed by the reaction of the activated nitrogen with aldehyde may be partially or fully etherified with one or more monofunctional alcohols. Suitable examples of the monofunctional alcohols include, without limitation, methanol, ethanol, propanol, isopropanol, butanol, isobutanol, tert-butyl alcohol, benzyl alcohol etc. Monofunctional alcohols having one to four carbon atoms and their mixtures are preferred. The etherification may be carried out, for example, by the processes disclosed in U.S. Pat. Nos. 4,105,708 and 4,293,692, the inventions of which are incorporated herein by reference.

The aminoplast may be at least partially etherified, and in various embodiments the aminoplast is fully etherified.

Amine curing agents may also be used in the coating composition of the present invention. Examples of amine curing agents include ethylene diamine, diethylene triamine, tetra-ethylene pentamine, isophorone diamine, N-aminoethyl piperazine, m-xylylenediamine, and the like. In particular, melamine and blocked isocyanate are used for 1 k coating systems as curing agents while isocyanate is used for 2 k coating systems.

In the coating composition of the present invention, the amount of the curing agent may be from 15% to 30% by weight, based on the total weight of the binder in the coating composition of the present invention, and preferably from 20% to 30% by weight.

The coating composition of the present invention may include a catalyst to promote the cure reaction. For example, especially if monomeric melamines are used as a curing agent, a strong acid catalyst may be utilized to enhance the cure reaction. Such catalysts are well-known in the art and include, without limitation, p-toluene sulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. For the reaction of polyisocyanates with suitable curable binder resin functionalities, suitable catalysts include tin compounds such as dibutyl tin dilaurate, dibutyl tin diacetate, dibutyl tin oxide, tertiary amines, zinc salts, and manganese salts. Reactions between epoxide and carboxyl groups during the cure reaction may be catalyzed with tertiary amines or quaternary ammonium salts (e.g., benzyl-dimethylamine, dimethylaminocyclohexane, triethylamine, N-methylimidazole, tetramethyl ammonium bromide, and tetrabutyl ammonium hydroxide), tin and/or phosphorous com-plex salts (e.g., $(CH_3)_3$ SNI, $(CH_3)_4$ PI, triphenylphosphine, ethyltriphenyl phosphonium iodide, tetrabutyl phosphonium iodide) etc.

Solvent is contained in the coating composition of the present invention. The solvent contained in the coating composition may be partly from the preparation of the cardanol-derivatives modified polymer of the present invention. The solvent used in formulating the coating composition of the present invention may be the same as the solvent used in preparing the cardanol-derivatives modified polymer of the present invention and may be selected from the same group of solvents suitable for preparing the cardanol-derivatives modified polymer of the present invention. The amount of solvent in the coating composition of the present invention may be selected by a skilled person according to practical applications.

The coating composition of the present invention may optionally include further rheology control agents, including high molecular weight mixed cellulose esters, such as CAB-381-0.1, CAB-381-20. CAB-531-1, CAB-551-0.01, and CAB-171-15S (available from Eastman Chemical Company, Kingsport, Tennessee), which may be included in amounts of up to 5% by weight, or from 0.1% to 5% by weight, or from 1.5% to 4.5% by weight, based on total weight of the binder in the coating composition of the present invention. Further examples include microgel rheology control agents such as crosslinked acrylic polymeric microparticles, which may be included in amounts of up to 5% by weight of the total weight of the binder in the coating composition of the present invention; wax rheology control agents such as polyethylene waxes including acrylic acid-modified polyethylene wax (e.g., Honeywell A-C® Performance Additives), poly(ethylene-vinyl acetate) copolymers, and oxidized polyethylene that may be included in amounts of up to 2% by weight of the total weight of the binder in the coating composition of the present invention; and fumed silicas, which may be included in amounts of up to 10% by weight of the total weight of the binder in the coating composition of the present invention or from 3% to 12% by weight of the total weight of the binder in the coating composition of the present invention.

The coating composition of the present invention may further contain pigments. Nonlimiting examples of suitable pigments include inorganic pigments and organic pigments, such as titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and so on. The pigments are preferably dispersed in a resin or polymer or with a pigment dispersant, such as dispersed in the cardanol-derivatives modified polymer of the present invention, according to known methods. In general, the pigment and dispersing resin, polymer, or dispersant are brought into contact under a shear high enough to break the pigment agglomerates down to the primary pigment particles and to wet the surface of the pigment particles with the dispersing resin, polymer, or dispersant. The breaking of the agglomerates and wetting of the primary pigment particles are important for pigment stability and color development. Pigments may be utilized in amounts typically of up to 40% by weight, based on total weight of the coating composition.

The coating composition of the present invention may further contain additional additives, such as hindered amine light stabilizers, ultraviolet light absorbers, antioxidants, surfactants, stabilizers, wetting agents, adhesion promoters, etc. According to practical application, a skilled person will select appropriate amount of these additive in formulating the coating composition of the present invention.

The coating composition of the present invention may be used in various applications. In particular, the coating composition of the present invention may be used as automotive coating, such as automotive coatings for automotive original equipment manufacturing (OEM) or for automotive refinishing. In a preferable embodiment of the present invention, the coating composition of the present invention may be used as automotive clearcoat coating.

Embodiments

The following embodiments are used to illustrate the invention in more details.

The 1$^{st}$ embodiment is a cardanol-derivatives modified polymer obtained from a reaction of epoxy groups in a cardanol-derivative compound and carboxyl groups in a carboxyl-functional polymer, wherein the cardanol-derivative compound is the resultant product of cardanol reacted with haloalkylene oxide having a carbon number of from 3 to 10, preferably from 3 to 6, and the acid number of the carboxyl-functional polymer is from 100 to 200 mg KOH/g, preferably from 120 to 180 mg KOH/g, and at least 60% and preferably at least 65% of carboxyl groups in the carboxyl-functional polymer is reacted with epoxy groups in the cardanol-derivative compound.

The 2$^{nd}$ embodiment is the cardanol-derivatives modified polymer according to the 1$^{st}$ embodiment, wherein the Mw (weight average molecular weight) of the carboxyl-functional polymer is from 1000 g/mol to 12000 g/mol, more preferably from 1000 g/mol to 10000 g/mol, even more preferably from 1000 g/mol to 5000 g/mol, and most preferably from 1500 g/mol to 3500 g/mol.

The 3rd embodiment is the cardanol-derivatives modified polymer according to any one of embodiments 1 to 2, wherein the carboxyl-functional polymer is at least one selected from a group consisting of carboxyl-functional polyacrylics, carboxyl-functional polyesters, carboxyl-functional polyurethanes, and carboxyl-functional polyamides.

The 4th embodiment is the cardanol-derivatives modified polymer according to any one of embodiments 1 to 3, wherein the carboxyl-functional polymer is obtained from polymerization of monomers comprising (meth)acrylic acid and preferably further comprising styrene monomer.

The 5th embodiment is the cardanol-derivatives modified polymer according to any one of embodiments 1 to 3, wherein the carboxyl-functional polymer is obtained from copolymerization of monomers selected from a group consisting of hydroxy alkyl (meth)acrylate and monomers selected from a group consisting of a linear or cyclic alkyl dicarboxylic acid or anhydride and lactone, preferably the linear or cyclic alkyl dicarboxylic acid or anhydride is a linear or cyclic C2-C6 alkyl dicarboxylic acid or anhydride, preferably the hydroxy alkyl (meth)acrylate monomer is hydroxy $C_2$-$C_4$ alkyl (meth)acrylate, and preferably the lactone monomer is selected from the group consisting of γ-butyrolactone, δ-valerolactone and ε-caprolactone, and preferably the monomers for copolymerization further comprise a monomer selected from a group consisting of (meth) acrylic acid and styrene.

The 6th embodiment is the cardanol-derivatives modified polymer according to any one of embodiments 1 to 3, wherein the carboxyl-functional polymer is obtained from copolymerization of monomers selected from a group consisting of (meth)acrylic acid and monomers selected from a group consisting of methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, 2-ethylhexyl acrylate, 2-ethylhexyl methacrylate, 3,3,5-trimethylhexyl acrylate, 3,3,5-trimethylhexyl methacrylate, and preferably the monomers for copolymerization further comprise styrene.

The 7th embodiment is a process of preparing the cardanol-derivatives modified polymer according to any one of claims 1 to 6, comprising steps of:

i). providing a mixture containing the cardanol-derivative compound and the carboxyl-functional polymer and preferably further containing at least one catalyst selected from triphenyl phosphine, triphenyl antimony, and chromium (Ill) acetylacetonate; and ii). heating the mixture obtained in step i) at a temperature of less than 200° C. and preferably from 120° C. to 180° C. in the presence of solvent.

The 8th embodiment is the process according to embodiment 7, wherein in the mixture obtained in step i), the molar ratio of the total epoxy group of the cardanol-derivative compound to the total carboxyl group of the carboxyl-functional polymer is no more than 1:1 and preferably from 3:5 to 1:1.

The 9th embodiment is a coating composition containing the cardanol-derivatives modified polymer according to any one of claims 1 to 6 or obtained by the process according to any one of embodiments 7 to 8.

The 10th embodiment is the coating composition according to embodiment 9 comprising: (A) from 30% to 60% by weight of the cardanol-derivatives modified polymer according to any one of claims 1 to 6 or obtained by the process according to any one of claims 7 to 8, based on the total weight of the coating composition, and preferably from 40% to 60% by weight, and (B) from 15% to 30% by weight of a curing agent, based on the total weight of the binder in the coating composition, and preferably from 20% to 30% by weight, and preferably the curing agent is at least one selected from a group consisting of isocyanate curing agent, aminoplast curing agent, and amine curing agent, and remaining solvent.

The 11th embodiment is a process of preparing automotive coatings comprising a step of introducing the cardanol-derivatives modified polymer according to any one of embodiments 1 to 6 or obtained by the process according to any one of embodiments 7 to 8 into the coatings.

The 12th embodiment is a use of the cardanol-derivatives modified polymer according to any one of embodiments 1 to 6 or obtained by the process according to any one of embodiments 7 to 8, in preparing coatings for automotive original equipment manufacture or automotive refinishing.

EXAMPLES

The invention is further illustrated by following examples. The examples do not limit the scope of the invention as described and claimed. All parts are parts by weight unless otherwise defined.

Method of Determination of Acid Number

The acid number was determined in accordance with DIN EN ISO 2114 (date: June 2002), using "method A". The acid number corresponds to the mass of potassium hydroxide in mg which is needed to neutralize 1 g of sample under the conditions specified in DIN EN ISO 2114. The reported acid number corresponds to the total acid number specified in the DIN standard.

Method of Determination of Viscosity

Viscosity was measured at 25° C. with a Brookfield CAP 2000+ rotary viscometer, spindle 3, shear rate: 10000 $s^{-1}$.

Method of Determination of Mw (Weight-Average Molecular Weight)

Mn was determined by gel permeation chromatography (GPC) according to DIN 55672-1 (date: August 2007). Tetrahydrofuran is used as eluent and polystyrene is used as calibration polymer. The column material is styrene-divinylbenzene copolymer.

Method of Determination of Nonvolatile Content

In the present invention, the nonvolatile content of a sample was determined according to DIN EN ISO 3251 (Jun. 1, 2008) at 125° C., 60 min, initial mass 1.0 g (table A.2, Method C of DIN EN ISO 3251). The nonvolatile content of the sample was determined according to DIN EN ISO 3251, table A.1 (date: Jun. 1, 2008). In this determination, 1 g of sample is weighed out into an aluminum dish dried beforehand and is dried in a drying oven at 130° C. for 60 minutes, cooled in a desiccator and then weighed again. The residue, relative to the total amount of the sample introduced, corresponds to the nonvolatile content.

Method of Determination of Tg (Glass Transition Temperature) of the Polymers

Tg is determined for the purposes of the invention experimentally in accordance with DIN 51005 "Thermal Analysis (TA)—Terms" and DIN 53765 (March 1994) "Thermal Analysis—Differential Scanning calorimetry (DSC)". A 15 mg sample is weighed out into a sample boat and inserted into a DSC apparatus. After cooling to the start temperature, measurement is carried out in runs 1 and 2, under inert gas blanketing ($N_2$) of 50 ml/min, at a heating rate of 10 K/min, with cooling back down to the start temperature between each of the runs. Measurement takes place customarily in a temperature range from about 50° C. lower than the expected glass transition temperature up to about 50° C. higher than the glass transition temperature. The glass transition temperature for the purposes of the present invention and in accordance with DIN 53765, section 8.1, is the temperature in the 2nd measuring run at which half of the change in the specific heat capacity (0.5 delta cp) has been reached. It is determined from the DSC diagram (plot of the heat flow against the temperature). It represents the temperature which corresponds to the point of intersection of the center line with the measurement plot between the extrapolated baselines before and after the glass transition.

Example 1: The Preparation of the Carboxyl-Functional Acrylic Polymer 24.4 part solvent naphtha were loading into a glass flask of 2 L, at 150° C. and when the temperature was stabilized, 5.6 part of tert-butyl peroxy-2-ethylhexanoate and 1.2 part solvent naphtha were dropped slowly into the glass flask; 15 minutes later after the initiator dosing, 8.3 part Styrene, 18.4 part n-butyl methacrylate, 5.1 part 2-hydroxy ethyl methacrylate, 2.7 part ethyl hexyl acrylate, as well as 18.0 part of acrylic acid were dropped into the glass flask slowly; after the dosing of monomers being completed, the dosing of the initiator was kept for another 30 minutes; after one post-polymerization of 60 minutes, the mixture inside the glass flask was cooled down to 80° C., and 16.3 part of solvent naphtha was added. The obtained carboxyl-functional acrylic polymer has an acid number of 134 mg KOH/g.

Example 2: The Preparation of the Cardanol-Derivatives Modified Polymer Based on the Product Obtained from Example 1

1 Kg of the polymer suspension (content of the carboxyl-functional acrylic polymer obtained from example 1:61.5% by weight; solvent: naphtha) obtained from example 1 and 0.896 Kg of Cardolite NC513 (Cardolite Corporation, Zhuhai, China) were loaded into a reactor (in the reaction system inside the reactor, the molar ratio of epoxy group (from Cardolite NC513) and acid group (from the carboxyl-functional acrylic polymer prepared in example 1) is 1:1) and heated up to 120° C. 0.86 g of Triphenyl phosphine was added as catalyst for the reaction. The temperature was increased to 140° C. during the first hour and then was kept in a range of from 140° C. to 150° C.

The progress of the reaction was monitored according to acid number and EEW (Epoxy Equivalent Weight). When the EEW was not detectable (meaning the complete consumption of epoxy group), and acid number dropped to only 1.5 mg KOH/g, the reaction was completed. The obtained polymer was Cardolite NC513 modified carboxyl-functional acrylic polymer, which corresponds to the cardanol-derivatives modified polymer of the present invention.

The nonvolatile content and viscosity of the obtained product inside the reactor were measured according to the method described herein. Table 1 provides a comparison of nonvolatile content and viscosity of products obtained from example 1 and example 2.

TABLE 1

| Products obtained from | Nonvolatile content % | Viscosity (Pa · s) |
|---|---|---|
| Example 1 | 58-62 | 1.1-1.4 |
| Example 2 | 86 | 0.9 |

Example 3: The Preparation of the Carboxyl-Functional Polyester Polymer 37.4 parts of Hexahydro phthalic anhydride, 10.6 parts of adipic acid, 0.8 part of xylene, 17.4 parts of trimethylolpropane and 5 parts of hexanediol were loaded into a reactor, the temperature was slowly raised to 230° C. and the temperature of the head of column separation was kept below 95° C.; after the target acid number (in a range of 117-123 mg KOH/g) being reached, the mixture inside the reactor was cooled down to 100° C. and 30.8 parts of naphtha was added as solvent.

Example 4: The Preparation of the Cardanol-Derivatives Modified Polymer Based on the Product Obtained from Example 3

1 Kg of the polymer suspension (content of the carboxyl-functional acrylic polymer obtained from example 3:63.5% by weight; solvent: naphtha) obtained from example 3 and 0.8 Kg of Cardolite NC513 were loaded into a reactor (in the reaction system inside the reactor, the molar ratio of epoxy group from Cardolite NC513:acid group from the carboxyl-functional polyester polymer=1:1) and heated up to 120° C. 0.77 g of Triphenyl phosphine was added as catalyst for the reaction. The temperature was increased to 140° C. during the first hour and then was kept in a range of from 140° C. to 150° C.

The progress of the reaction was monitored according to acid number and EEW (Epoxy Equivalent Weight). When the EEW was not detectable (meaning the complete consumption of epoxy group), and acid number dropped to only 3.9 mg KOH/g, the reaction was completed. The obtained polymer was Cardolite NC513 modified carboxyl-functional polyester polymer, which corresponds to the cardanol-derivatives modified polymer of the present invention.

The nonvolatile content and viscosity of the obtained product inside the reactor were measured according to the method described herein. Table 2 provides a comparison of nonvolatile content and viscosity of products obtained from example 3 and example 4.

TABLE 2

| Products obtained from | Nonvolatile content % | Viscosity (Pa · s) |
|---|---|---|
| Example 3 | 62-66 | 2.8-4.4 |
| Example 4 | 83 | 1.5 |

The invention claimed is:

1. A cardanol-derivatives modified polymer obtained from a reaction of epoxy groups in a cardanol-derivative compound and carboxyl groups in a carboxyl-functional polymer, wherein the cardanol-derivative compound is a resultant product of cardanol reacted with haloalkylene oxide having a carbon number of from 3 to 10, and an acid number of the carboxyl-functional polymer is from 100 to 200 mg KOH/g, and at least 60% of carboxyl groups in the carboxyl-functional polymer is reacted with epoxy groups in the cardanol-derivative compound, and wherein:

the carboxyl-functional polymer is obtained from copolymerization of monomers selected from the group consisting of hydroxy alkyl (meth)acrylate and monomers selected from the group consisting of a linear or cyclic alkyl dicarboxylic acid or anhydride and lactone; or the carboxyl-functional polymer is at least one selected from the group consisting of carboxyl-functional polyurethanes and carboxyl-functional polyamides.

2. The cardanol-derivatives modified polymer according to claim 1, wherein a weight average molecular weight of the carboxyl-functional polymer is from 1000 g/mol to 12000 g/mol.

3. A process of preparing the cardanol-derivatives modified polymer according to claim 1, comprising steps of:

i). providing a mixture containing the cardanol-derivative compound and the carboxyl-functional polymer; and ii). heating the mixture obtained in step i) at a temperature of less than 200° C.

4. The process according to claim 3, wherein in the mixture obtained in step i), a molar ratio of a total epoxy group of the cardanol-derivative compound to a total carboxyl group of the carboxyl-functional polymer is no more than 1:1.

5. A coating composition containing the cardanol-derivatives modified polymer according to claim 1.

6. A coating composition comprising:

(A) from 30% to 60% by weight of the cardanol-derivatives modified polymer according to claim 1, based on a total weight of the coating composition, and (B) from 15% to 30% by weight of a curing agent, based on a total weight of a binder in the coating composition.

7. A process of preparing automotive coatings comprising a step of introducing the cardanol-derivatives modified polymer according to claim 1 into the coatings.

8. The cardanol-derivatives modified polymer according to claim 1, wherein a weight average molecular weight of the carboxyl-functional polymer is from 1000 g/mol to 10000 g/mol.

9. The cardanol-derivatives modified polymer according to claim 1, wherein the carboxyl-functional polymer is obtained from copolymerization of monomers selected from the group consisting of hydroxy alkyl (meth)acrylate and monomers selected from the group consisting of a linear or cyclic alkyl dicarboxylic acid or anhydride and lactone, wherein the monomers for copolymerization further comprise a monomer selected from the group consisting of (meth)acrylic acid and styrene.

10. A process of preparing the cardanol-derivatives modified polymer according to claim 1, comprising steps of:

i). providing a mixture containing the cardanol-derivative compound and the carboxyl-functional polymer and further containing at least one catalyst selected from the group consisting of triphenyl phosphine, triphenyl antimony, and chromium (III) acetylacetonate; and ii). heating the mixture obtained in step i) at a temperature of less than 200° C.

11. The process according to claim 3, wherein in the mixture obtained in step i), a molar ratio of a total epoxy group of the cardanol-derivative compound to a total carboxyl group of the carboxyl-functional polymer is from 3:5 to 1:1.

12. A coating composition comprising:

(A) from 45% to 65% by weight of the cardanol-derivatives modified polymer according to claim 1, based on a total weight of the coating composition, and (B) from 20% to 30% by weight of a curing agent, based on a total weight of a binder in the coating composition, wherein the curing agent is at least one selected from the group consisting of isocyanate curing agent, aminoplast curing agent, amine curing agent, and remaining solvent.

13. The cardanol-derivatives modified polymer according to claim 1, wherein a molar ratio of a total epoxy group of the cardanol-derivative compound to a total carboxyl group of the carboxyl-functional polymer is no more than 1:1.

* * * * *